Patented May 1, 1945

2,374,683

UNITED STATES PATENT OFFICE 2,374,683

DEHALOGENATION OF STEROIDS

Percy L. Julian, Maywood, John Wayne Cole, Chicago, Arthur Magnani, Wilmette, and Harold E. Conde, Chicago, Ill., assignors to The Glidden Company, Cleveland, Ohio, a corporation of Ohio No Drawing. Application February 10, 1944, Serial No. 521,850

10 Claims. (Cl. 260—397.1)

This invention relates to the removal of halogen from halogenated compounds of the cyclopentano-polyhydrophenanthrene series, and particularly from 3-keto-5,6-dihalo-compounds.

The classical method of removing halogen from dihalides by means of zinc and acetic acid, when applied to 5,6-dihalo-3-keto-steroids, gives the unsaturated ketone in relatively poor yields and contaminated with impurities which are frequently difficult or impossible to remove. Steroids containing sensitive functional groups such as carbonyl or alcoholc groupings may suffer reduction of these functional groups resulting in the formation of hydrocarbons, pinacols and the like. Thus Butenandt, Ber. 67, 2087 (1934) on debromination of 5,6-dibromo-pregnandione-3,20, found in certain instances that ring A had suffered complete reduction of its carbonyl group to a methylene group. Fernholz had difficulty in the isolation of crystalline progesterone, Ber. 67, 2027 (1934) following this debromination procedure. Steiger and Reichstein, Helv. Chim. Acta 20, 1177 (1937) had similar difficulty in isolating pure desoxycorticosterone acetate following a similar debromination procedure.

An alternative method for removal of halogen is the treatment of a dihalide with sodium iodide, which procedure gives good results in certain cases—see Schoenhaimer, J. Biol. Chem. 110, 461 (1935). This reaction is an equilibrium reaction and at ordinary temperatures goes very slowly in the desired direction. In cases where the dihalo compound can be treated with sodium iodide at elevated temperatures, such as was the case with Schoenheimer's cholesterone dibromide, the reaction proceeds with good yield. Most 3-keto-5,6-dihalo-steroids are, however, sensitive to heat, and the reaction with sodium iodide must be carried out at relatively low temperatures. At these temperatures it is difficult to remove all halogen within a reasonable time and frequently the unsaturated 3-keto-derivative is found to contain traces of halogen, which is fatal to the stability of most 3-keto-$\Delta^4$-steroids. For example, a crystalline progesterone preparation containing a trace of such halogen undergoes resinification on standing.

It is accordingly an object of the present invention to provide an improved process for the dehalogenation of steroid compounds.

An additional object is to provide a process for dehalogenating of 3-keto-5,6, dihalo compounds of the steroid series whereby increased yields of the resulting unsaturated compounds are obtained.

A further object is to provide an efficient process for the dehalogenation of 3-keto-5,6 dihalo compounds of the steroid series at room temperatures.

Other objects will be apparent to those skilled in the art from the following description.

We have found that the halogen is removed rapidly and cleanly from the dihalo-ketones by means of chromous chloride, vanadous chloride or titanous chloride at room temperature. The $\Delta^4$-3-keto-steroid is in some cases crystallized directly from the mixture; in other cases it is extracted by means of a water-immiscible solvent then concentrated. In all cases the product, without further purification, has been of a relatively high degree of purity.

While our method of dehalogenation has been developed primarily for the preparation of $\Delta^4$-3-keto steroids, we have observed also that chromous chloride and the other chlorides mentioned above will dehalogenate other dihalides.

The following examples illustrate the invention:

EXAMPLE I

To a suspension of 30 grams of finely powdered 3-hydroxy-$\Delta^5$-ter-nor-cholenyl-diphenyl-carbinol (recrystallized from chloroform) in 250 cc. glacial acetic acid is added at room temperature a solution of 2.7 cc. (8.4) grams of bromine in 150 cc. of glacial acetic acid. The solution is warmed to 96–100° F. and an ozone-oxygen mixture containing 3 to 4% of ozone by volume passed in for 30 minutes at a rate of flow of 3.5 liters per minute. The dibromide of the carbinol usually crystallizes out of solution toward the end of the bromination time and the solution should be clear at the end of the ozonization. During the ozonization the temperature rises several degrees.

The solution after ozonization is cooled at once to 70° F. and the oxidizing mixture, cooled before using, and consisting of 10 grams chromic oxide, 1 cc. concentrated sulfuric acid, 15 cc. of water and 80 cc. of glacial acetic acid, is added with stirring during several minutes, never allowing the temperature of the reaction mixture to rise above 80° F. After standing for 1 hour at room temperature, 20 cc. of methanol is added to the reaction mixture. The reaction mixture is now diluted with 500 cc. of glacial acetic acid and the resulting solution cooled to 60° F. 300 cc. of one molar chromous chloride solution, prepared according to the procedure of Conant and Cutter J. A. C. S. 48 1023 (1926), is then added with shaking under an atmosphere of carbon dioxide. After standing for ½ hour (or the solution may stand as long as over-night if desired), the solution is concentrated under the vacuum of a water pump and at 80 to 90° C. until 500 to 600 cc. of distillate have collected.

The reaction mixture is now diluted with 3 to 4 volumes of water and extracted four times with ether. The ether extractions are washed successively with water, 10% sodium hydroxide solution, and water again. The washed ether extracts are combined, concentrated and steam distilled. The residue from the steam distillation is cooled, taken up in ether and the ether extract again washed successively with water, dilute sodium hydroxide and water. The final ether solution is concentrated to a volume of about 20 cc. whereupon progesterone crystallizes out on cooling. The crude progesterone is filtered and washed with a cold petroleum ether mixture. The average yield is about 7.5 grams, M. P. 118 to 127° C. On again steam distilling, the mother liquors and working up as indicated above, 2 grams of a second crop of material, M. P. 116 to 121° may be obtained. The crude progesterone is purified by crystallization from acetone, yielding colorless prisms melting at 127 to 129° C.

EXAMPLE II

The procedure was identical with that in Example I except that the chromous chloride was replaced by 300 cc. of a 1 molar solution of vanadous chloride prepared according to the method of Conant and Cutter, J. A. C. S. 48 1023 (1926), and the vanadous chloride was added to the mixture without dilution of the mixture prior to the addition of the debrominating agent. The crude progesterone had a melting point of 117 to 124° C.

EXAMPLE III

The procedure was the same as in Example I except that 300 cc. of a commercial 20% solution of titanous chloride was used as the debrominating agent, and there was no dilution of the reaction mixture prior to the addition of the debrominating agent. The crude progesterone had a melting point of 117 to 124° C.

EXAMPLE IV

The procedure was the same as in Example III, except that the reaction mixture was heated on a steam cone for one hour for the debromination. The crude progesterone had a melting point of 113 to 119° C.

EXAMPLE V

PROGESTERONE FROM PROGESTERONE DIBROMIDE

A solution of 2.8 grams of 5,6-dibromo-pregnan-3,20-dione (prisms, melting at 80 with decomposition, prepared by brominating $\Delta^5$-pregnen-3-ol-20-one and oxidizing the product with $CrO_3$ in acetic acid) in 80 cc. of acetone was treated with 60 cc. of one molar chromous chloride solution at 26° C. for two hours, then a part of the acetone was distilled. The residue was extracted with ether and the ether solution washed with water and bicarbonate solution. Concentration and crystallization from ether and petroleum ether yielded a trace of a crystalline substance melting at about 235°, then 1.7 grams (92% of the theoretical amount) of colorless crystalline progesterone.

Similarly the acetic acid solution of crude 5,6-dibromo-pregnan-3,20-dione prepared from 2.0 grams of pregnen-3-ol-20-one was treated with 60 cc. of chromous chloride solution under carbon dioxide, and 1.6 grams (80% of the theoretical amount) of crystalline progesterone separated.

The analogous zinc dust and acetic acid treatment gave a mixture of products containing less than 40% progesterone and together with a higher-melting by-product. Another by-product from this preparation has been described by Butenandt, Ber. 67, 2085 (1934).

EXAMPLE VI

DEBROMINATION OF ANDROSTENEDIONE DIBROMIDE

The dehydroandrosterone dibromide, obtained by brominating 2.0 grams of dehydroandrosterone, M. P. 135–140, in chloroform then removing the solvent, was dissolved in acetic acid and oxidized with 1.2 grams of chromic acid for 2 hours at 26° C. The androstenedione dibromide was separated by means of ether, washed, concentrated, then treated in acetone solution under carbon dioxide with 60 cc. of one-molar chromous chloride solution for two hours. A part of the acetone was distilled, and the residue diluted and extracted with ether. The washed ether extract yielded 1.6 grams of colorless $\Delta^4$-androsten-3,17-dione melting at 167–169.

In a comparative androstenedione preparation employing zinc dust and acetic acid as the debrominating method, 2 grams of dehydroandrosterone—brominated and oxidized exactly as above—yielded 1.0 grams of androstenedione melting at 152–155, plus gummy material from the mother liquor.

EXAMPLE VII

PREPARATION OF $\Delta^{4,5}$-3- KETO BISNORCHOLENIC ACID

A suspension of 10 grams of $\Delta^{5,6}$-3-hydroxy-bisnorcholenic acid, M. P. 288–290, in 300 cc. of glacial acetic acid at 25° C. was treated with 4.1 grams of bromine in 20 cc. of acetic acid. The resulting clear solution was oxidized for two hours with 4 grams of $CrO_3$ in 8 cc. of water and 30 cc. of acetic acid. 10 cc. of methanol was added to destroy excess $CrO_3$, and the resulting solution of dibromo-keto acid was mixed, under carbon dioxide, with 150 cc. of chromous chloride solution and held at 25° C. for two hours. A part of the acetic acid was removed by distillation. A part of the product, $\Delta^{4,5}$-3-keto-bisnorcholenic acid melting at 269–271, crystallized directly from the concentrate, but a considerable portion was also extracted from the mother liquor with ether. The yield of first crop colorless crystals was 6.0 grams.

EXAMPLE VIII

PREPARATION OF $\Delta^{4,5}$-3-KETO ETIOCHOLENIC ACID

A suspension of 4.7 grams of $\Delta^{5,6}$-3-hydroxy-etio-cholenic acid M. P. 276–278, in 220 cc. of glacial acetic acid at 25° C. was treated successively with 2.2 grams of bromine in 22 cc. of acetic acid during five minutes, with 2.0 grams of chromium trioxide in 4 cc. of water and 30 cc. of acetic acid for two hours, with 10 cc. of methanol for 20 minutes, then with 100 cc. of one-molar chromous chloride solution under carbon dioxide for two hours. From the resulting green solution crystals of the product, $\Delta^{4,5}$-3-keto-etio-cholenic acid, began to separate. Slow addition of 250 cc. of water brought down a first crop of 3.8 grams (80% of the theoretical amount) of colorless crystals of the keto acid melting at 244. Ether extraction of the mother liquor gave a small additional quantity of the keto acid.

EXAMPLE IX

Preparation of Desoxycorticosterone Acetate

A chloroform solution of 1.5 grams of $\Delta^{5,6}$-pregnen-3,21-diol-20-one 21-monoacetate was treated with 0.65 gram of bromine dissolved in chloroform. The solvent was removed, the dibromide dissolved in acetic acid and oxidized for one hour at 25° C. with 0.7 gram of $CrO_3$. The 5,6-dibromo-3-ketone so obtained was separated by dissolving it in ether and washing thoroughly with water. The ether solution was concentrated to about 10 cc., then diluted with 90 cc. of acetone, covered with carbon dioxide to exclude air, then treated with 50 cc. of one-molar chromous chloride solution at 28° C. After two hours the acetone was partly removed by distillation, and the unsaturated ketone extracted from the residue by means of ether. Upon evaporating the ether 1.2 grams of colorless crystals of desoxycorticosterone acetate (melting at 158) separated.

EXAMPLE X

Preparation of 17-methyl-testosterone

A. $\Delta^{5,6}$-17-methyl-trans-androstene-3,17-diol 20 gm. dehydroandrosterone in 1500 cc. absolute ether.

13.4 gm. magnesium, 80 gm. methyl iodide in 300 cc. absolute ether.

The Grignard solution was prepared in a 3-liter, 3-necked round-bottom flask fitted with a reflux condenser and a mercury seal stirrer. The ether solution of dehydroandrosterone was added portionwise to the Grignard solution as rapidly as possible from a separatory funnel. The white, ether-insoluble Grignard product came out of solution immediately. The whole was then warmed on a steam bath with continued stirring overnight, maintaining the steam flow at a rate such as to keep the ether gently boiling. The whole mixture was then poured onto ice and and ammonium chloride with vigorous agitation. The ether-insoluble portion of the product was filtered off and washed well with water and ether, dried and weighed. The ether portion of the filtrate was washed well with water and concentrated for crystallization of a second crop.

First crop of product=
15.0 gm., M. P. 200–202° C.

Second crop of product=
2.0 gm., M. P. 200–201° C.

B. 17-methyl-testosterone 5 gms. of the above carbinol prepared in A was dissolved in 85 cc. acetic acid in a round-bottom flask fitted with an air-driven stirrer. This solution was cooled to 60° F. and then 0.84 cc. bromine (2.62 gm.) in 50 cc. glacial acetic acid were added dropwise with stirring, maintaining the temperature of the reaction mixture at 60° F.

A solution of 1.3 gm. $CrO_3$ (about 1.4 mol oxygen) in 25 cc. acetic acid was added slowly with stirring at a temperature of 60° F. and the mixture then allowed to stand overnight at a temperature of 60–70° F. 10 cc. methanol were added and the solution diluted with an equal volume of acetic acid. The solution was then cooled to 60° F. and 85 cc. (2½ mol. excess) of 1 M chromous chloride solution was added, with shaking under an atmosphere of carbon dioxide. This mixture was then allowed to stand for 1½ hours, after which it was concentrated under vacuum produced by a water pump to approximately ½ volume, diluted to three liters with cold water and extracted with ether. The clear, water-white ether extract was washed with water, dilute sodium hydroxide solution and finally with water, dried over sodium sulfate and concentrated to a syrup. On scratching with a seed of methyl-testosterone, crystallization of the product began. The mixture was diluted with ether-petroleum ether, and set in the ice box for crystallization. The first crop was filtered and washed with petroleum ether. A second crop was obtained by concentration of the mother liquor.

1st crop=2.0 gm., M. P. }
2nd crop=0.5 gm., M. P. } 145–150° C.

The M. P. may be raised by recrystallization.

Reference is made to copending application Serial No. 521,851, filed concurrently herewith.

Having described the invention, what is claimed is:

1. The method of dehalogenating halides of the steroid series containing halide groups attached to adjacent carbon atoms which comprises treatment of said steroid with a halide salt selected from the class consisting of chromous chloride, vanadous chloride and titanous chloride as the dehalogenating agent.

2. The method of removing halogen from 5,6-dihalo 3-keto steroids which comprises removing said halogen with a halide salt selected from the class consisting of chromous chloride, vanadous chloride, and titanous chloride as the dehalogenating agent.

3. The method of removing bromine from 5,6-dibromo-3-keto steroids which comprises removing bromine from said steroid with the aid of a halide salt selected from the class consisting of chromous chloride, vanadous chloride, and titanous chloride as the debrominating agent.

4. The method of removing halogen from 5,6-dihalo-3-keto steroids which comprises removing halogen from said steroids with the aid of chromous chloride as a dehalogenating agent.

5. The method of removing bromine from 5,6-dibromo-3-keto steroids which comprises removing bromine from said steroids with the aid of chromous chloride as a dehalogenating agent.

6. The method of debrominating 5,6-dibromo-3-keto steroids of the pregnane series which comprises removing bromine from said steroids with the aid of a halide salt selected from the class consisting of chromous chloride, vanadous chloride, and titanous chloride as debrominating agents.

7. The method of removing bromine from progesterone dibromide which comprises removing the bromine with the aid of chromous chloride as a debrominating agent.

8. The method of debrominating 5,6-dibromo-3-keto steroids of the androstane series which comprises removing the bromine with the aid of chromous chloride as the debrominating agent.

9. The process of claim 8 in which the steroid is 5,6-dibromo-17 methyl testosterone.

10. The process of debrominating 5,6-dibromo-3-keto etio cholanic acid which comprises removing bromine from said acid with the aid of chromous chloride as a debrominating agent.

PERCY L. JULIAN.
JOHN WAYNE COLE.
ARTHUR MAGNANI.
HAROLD E. CONDE.